United States Patent
Mika

(10) Patent No.: US 7,455,212 B2
(45) Date of Patent: Nov. 25, 2008

(54) DEPOSITION FRICTION STIR WELDING PROCESS AND ASSEMBLY

(75) Inventor: David Peter Mika, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 413 days.

(21) Appl. No.: 11/288,502

(22) Filed: Nov. 29, 2005

(65) Prior Publication Data

US 2007/0119906 A1    May 31, 2007

(51) Int. Cl.
*B23K 20/12* (2006.01)
*B23K 37/00* (2006.01)
*B23K 31/02* (2006.01)

(52) U.S. Cl. .................. 228/112.1; 228/2.1
(58) Field of Classification Search .......... 228/2, 228/1, 112.1
See application file for complete search history.

(56) References Cited

U.S. PATENT DOCUMENTS

| | | | | |
|---|---|---|---|---|
| 5,813,592 | A | * | 9/1998 | Midling et al. ........... 228/112.1 |
| 5,971,252 | A | * | 10/1999 | Rosen et al. ............. 228/112.1 |
| 6,045,028 | A | | 4/2000 | Martin et al. |
| 2003/0205565 | A1 | | 11/2003 | Nelson et al. |
| 2004/0129763 | A1 | * | 7/2004 | Burford et al. ........... 228/112.1 |
| 2005/0139640 | A1 | * | 6/2005 | Kay ......................... 228/112.1 |

FOREIGN PATENT DOCUMENTS

| | | |
|---|---|---|
| EP | 1464434 | 10/2004 |
| JP | 11320127 | 11/1999 |
| JP | 11320128 | 11/1999 |
| JP | 2000206245 | 7/2000 |
| JP | 3398135 | 4/2003 |
| JP | 2004042115 | 2/2004 |
| JP | 2004261859 | 9/2004 |

OTHER PUBLICATIONS

T.J. Lienert, "Friction Stir Welding Of Mild Steel", Cooperative Research Program, EWI, Summary Report SR9903, 1999.
Tim Li, "Friction Stir Welding Of Steel", EWI, 2005.
Tim Trapp, "Advancements in Friction Stir Welding", EWI, 2005.
JP11320127 Abstract, Nov. 24, 1999.
JP11320128 Abstract, Nov. 24, 1999.
JP2000202645 Abstract, Jul. 25, 2000.
JP2004042115 Abstract, Feb. 12, 2004.
JP2004261859 Abstract, Sep. 24, 2004.
EP06125031, Search Report, Mar. 12, 2007.

* cited by examiner

*Primary Examiner*—Jessica L Ward
*Assistant Examiner*—Nicholas P D'Aniello
(74) *Attorney, Agent, or Firm*—Francis T. Coppa

(57) ABSTRACT

A deposition friction stir weld process of joining work pieces includes placing a filler material on and about a joint line formed by butting a first work piece surface against a second work piece surface; and frictionally heating the filler material to soften the filler material and portions of the first and second work piece surfaces in thermal contact with the filler material and form a weld between the first and second work pieces, wherein frictionally heating is at a temperature below a melting point of the filler material and the first and second workpiece surfaces. Also disclosed herein are friction stir welding assemblies for providing the deposition friction stir weld as well as processes for depositing filler material and contouring a workpiece surface.

15 Claims, 5 Drawing Sheets

Travel In and Out of Paper

DEPOSITION FRICTION STIR WELDING PROCESS AND ASSEMBLY

BACKGROUND

The present disclosure generally relates to friction stir welding and, more specifically, to processes of friction stir welding that include providing an additional solid-state source during the friction stir welding.

Friction stir welding is a solid-state joining process that that provides material deformation similar to that of extrusion forging. Since the friction stir welding process occurs at a temperature below the melting point of the work piece material, solidification-related defects that are common in fusion type welds, for example, are substantially eliminated, and friction stir welding generally provides relatively higher joint strengths. Additionally, the lower heat input used in the friction stir welding process as opposed to other welding processes results in less residual stress, less distortion, and less impact to the final metallurgical properties of the work piece. Many joint designs are possible using friction stir welding including, but not limited to corner and T-joints.

As shown in prior art FIGS. 1 and 2, a typical friction weld stirring apparatus 10 uses a cylindrical, shouldered tool 12 with an optional profiled pin 14 that is rotated and slowly plunged into a joint line 16 between two pieces of sheet or plate material 18, 20, which are butted together and clamped by a mechanical clamp 22. A typical mechanical clamp includes a top plate 26 and a bottom plate 28 and threaded bolts 24 for locking the butted work pieces 18, 20 therebetween during operation. Frictional heat is generated between the rotary tool 10 and the immediate region about the joint line 16 defined by the butted work pieces 18, 20, which cause region about the joint line 16 to soften and plastically flow without reaching the melting point. As the rotary tool traverses the joint line, the plasticized material is transferred from the leading edge of the tool to the trailing edge of the tool shoulder and pin, leaving a solid phase bond between the two work pieces. To terminate the weld, the linear traversal along the weld line is terminated and the rotary tool is retracted from the workpiece surface leaving behind an exit keyhole. Providing a run-out region that can subsequently be removed can eliminate the exit keyhole, but this is not always feasible nor cost effective. Alternative processes to eliminate the exit keyhole effect have been developed such as the use of a variable penetration tool that can be slowly retracted while traversing the weld line. This can result in a smooth transition from a non-welded region to a fully welded region back to a non-welded region. Other known techniques to eliminate the exit keyhole effect include modification of the pin profile. Current methods are not entirely effective at eliminating the exit keyhole effect.

Another one of the ongoing problems with current friction stir welding processes is that the welding process has a tendency to produce flash material and also results in a general thinning of material along the weld line. The reduction in cross sectional thickness about the weld line reduces the serviceable load of the joint. This strength reduction must be mitigated by a thickness compensated design and this penalty can be significant in many situations especially for plate joining applications where additional thickness penalties must be made across the entire width of the plate. Moreover, the production of flash material presents safety concerns for handling personnel and requires further post-processing.

Accordingly, it would be desirable for friction stir weld processes that compensated for the production of flash and general thinning of material along the weld line as well as provided a relatively smooth transition from the non-weld regions to the welded region.

BRIEF SUMMARY

Disclosed herein are deposition friction stir weld processes and assemblies. In one embodiment, a friction stir weld process of joining work pieces comprises placing a filler material on and about a joint line formed by butting a first work piece surface against a second work piece surface and frictionally heating the filler material to soften the filler material and portions of the first and second work piece surfaces in thermal contact with the filler material and form a weld between the first and second work pieces, wherein frictionally heating is at a temperature below a melting point of the filler material and the first and second workpiece surfaces.

A friction stir weld assembly comprises a cylindrical, shouldered rotary tool with an optional profiled pin; and a first die in operative communication with the rotary tool, the first die comprising an aperture extending through a top surface to a bottom surface that is adapted to receive at least the profiled pin of the rotary tool and a recessed portion, wherein the recessed portion has a width greater than a joint line formed between two or more abutting work pieces to be welded.

In another embodiment, a process for depositing and contouring a surface of a work piece comprises frictionally heating a selected surface of the work piece at a temperature below a melting point of the work piece, wherein the selected surface softens; and containing the softened surface with a die to contour the surface and prevent flash material from being discharged during the frictional heating.

In yet another embodiment, a spot friction weld process comprises frictionally heating a spot on a work piece surface to a temperature effective to soften a region at and about the spot, wherein the temperature is below a melting point of the work piece surface; and containing the spot to prevent discharge of a flash material from the work piece surface.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Applicant has discovered a process of friction stir welding that compensates for the production of flash and general thinning of material along the joint line during the solid-state joining process of two or more work pieces. The friction stir welding process in accordance with the present disclosure utilizes a so-called deposition friction stir welding process that generally includes depositing an additional solid-state material (also referred to herein as filler material) to the joint region along the joint line during the friction stir welding of two or more butted work pieces. As will be described in greater detail below, the additional solid-state material is introduced to the joint region in such a manner so as to contain the weld free surface as well as shape the resulting weld profile. As such, the resulting weld joint can be produced with a relatively thicker cross sectional thickness than prior art friction stir welding processes, thereby overcoming many of the above noted problems of the prior art as well as providing a more versatile friction stir weld process suitable for numerous types of applications previously unattainable.

Figure 3:
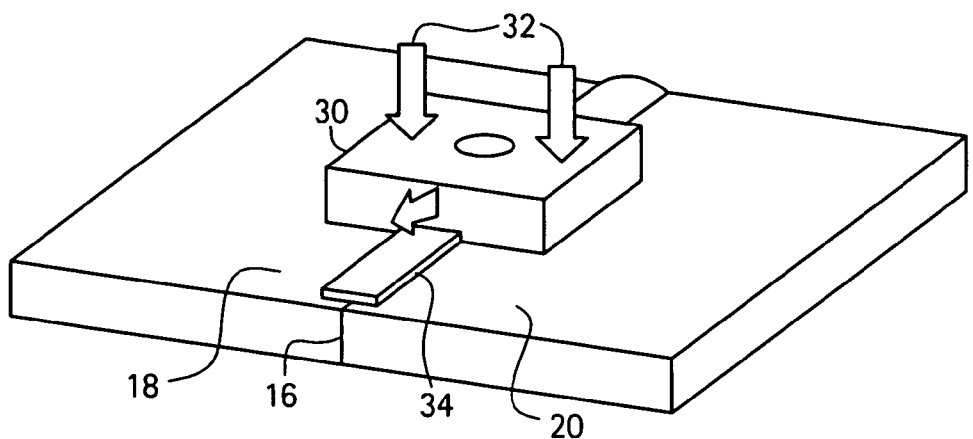
FIG. 3 is a perspective view of an exemplary die and filler material assembly for use with a rotary tool device for practicing a deposition friction stir weld process in accordance with the present disclosure.

In one embodiment, the process comprises placing a die 30 over the butted joint line 16 of the work pieces 18, 20 to be joined in the manner shown in FIG. 3. The die 30 is shaped to cover at least a portion of the joint provided by the abutting work pieces to be joined and is adapted to receive a filler material 34. During welding, a load as indicated by arrows 32 is placed on the die to maintain contact with the work piece surfaces.

Figure 1:
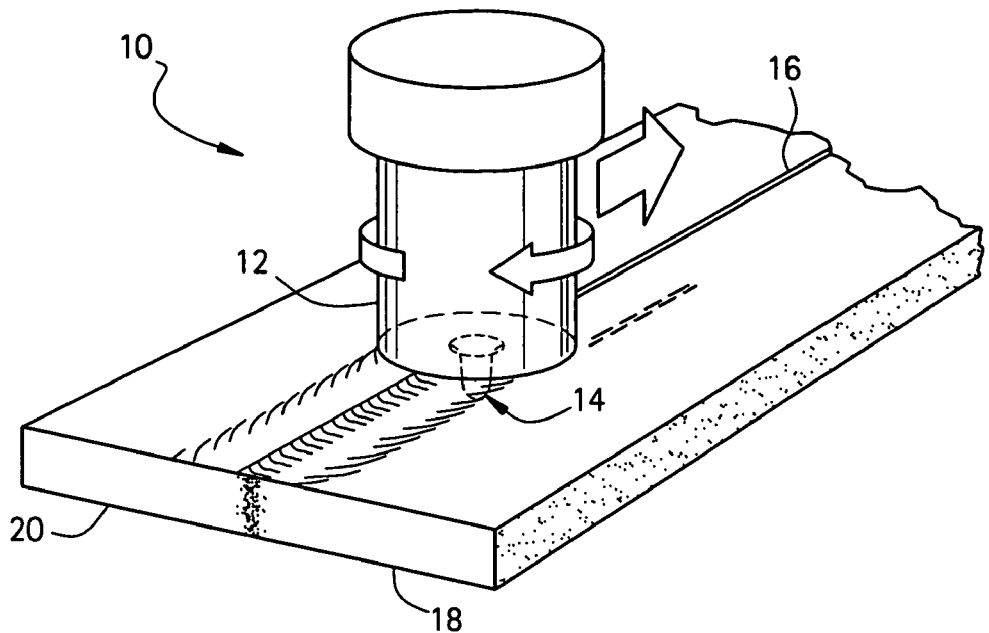
FIG. 1 illustrates a perspective view of a prior art friction stir welding apparatus.
Figure 2:
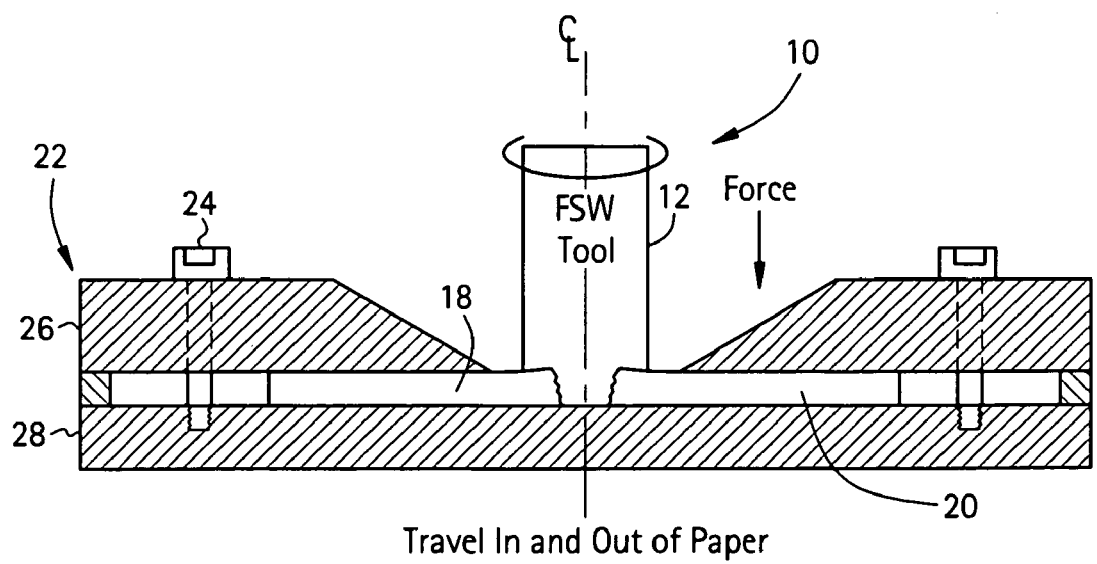
FIG. 2 schematically illustrates a sectional of the prior art friction stir welding apparatus of FIG. 1.
Figure 4:
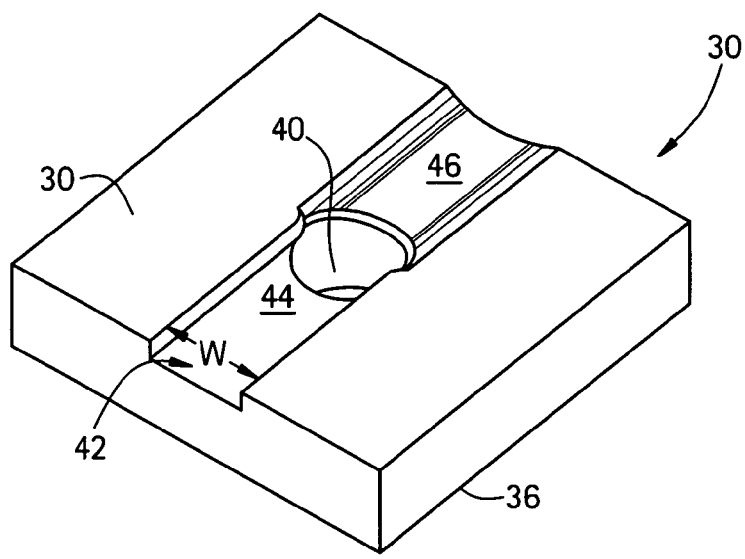
FIG. 4 is a perspective view of a die as viewed from the bottom surface of the die.

As shown more clearly in FIG. 4, the die 30 includes a top surface 36 and a bottom surface 38 (for clarity, the die 30 is illustrated upside down relative to its actual use). An aperture 40 extends through the top surface 36 to the bottom surface 38 and is adapted to receive a cylindrical, shouldered rotary tool and optional profiled pin 14 of a rotary friction stir welding apparatus 10, a suitable example of which is shown in prior art FIGS. 1 and 2. A recessed portion 42 is formed in the bottom surface 8 and is shown extending from one end of the die to an opposite end. The recessed portion 42 is contiguous with the aperture 40. Although the die 30 is illustrated as generally having a block shape, other shapes are contemplated and well within the scope of the disclosure. The die preferably has a higher melting point temperature and strength than the filler materials 34 or the work pieces 18, 20 to be joined.

The recessed portion 42 defines an inlet zone 44 and an extrusion zone 46. Using the translational direction of the rotary tool 10 during the joining of the two work pieces 18, 20 along the joint line 16 as a reference, the inlet zone 44 is located forward the aperture 40 whereas the extrusion zone 46 is located rearward. Thus, during operation the rotary tool traverses the region underlying the inlet zone to join the work pieces 18, 20. The inlet zone 44 preferably has a profile complementary to the profile of the filler material 34. As such, the dimensions of the inlet zone 44 are adapted to accommodate the filler material 34, which is inserted into the inlet zone 44 during a welding operation. In contrast, the extrusion zone 46 is adapted to receive and shape the plasticized material as it is transferred from the leading edge of the tool to the trailing edge. The extrusion zone 46 can include any profile as may be desired for the particular application so as to obtain a shaped weld profile. In FIG. 4, the extrusion zone 46 is illustrated as having a tapered profile.

In general, the width W of the recessed portion is at least greater than the space defining the joint line 16, i.e., overlaps the space between the butted work pieces 18, 20. In other embodiments, the width of the recessed portion is equal to or greater than the diameter of the aperture 40.

Referring again to FIG. 3, the filler material 34 preferably covers the length of the joint line 16 desired to be welded that is forward the initial welding spot, i.e., at about the aperture 40. Depending on the application, the filler material 34 can extend from the die 30 or be contained entirely within the die 30. Additionally, it should be noted that the filler material can be a single strip or may comprises numerous pieces that form the filler strip, may be a powder, may be in the form of pellets, or the like.

In still other embodiments, alternative filler material 34 feed configurations can be employed. In one embodiment, the filler material is inserted though a separate channel into the stir zone. That is, the separate channel can be independent of the inlet zone or can replace the inlet zone. In these and the various embodiments described above, insertion of the filler material into the stir zone can be by any means such as for example, piston assisted delivery, through the axis of the tool, or the like. Additionally, the rotary tool itself can be configured to provide the filler material to the stir zone. Such modification is well within the skill of those in the art without departing from the scope of the present disclosure. The present process is not intended to be limited to any particular filler material delivery method or form.

The deposition friction stir weld process comprises clamping the work pieces 18, 20 to be joined together. The die 30 is then placed on the joint line with care being taken to align the recessed portion 42 with the joint line 16. The filler material 34 is inserted into the inlet zone 44 of the recessed portion 42 covering one end of the joint line 16 to the other end. The rotary tool 10 (FIGS. 1 and 2) is then slowly plunged into the aperture 40 and onto the filler material 34. Frictional heat is generated between the pin 14 and the filler material 34, which causes the filler material 34 to soften without reaching its melting point. Frictional heat is also locally transferred to the underlying joint region of the work pieces 18, 20, which simultaneously softens portions of the workpiece along the joint line to form a solid phase bind between the two work pieces 18, 20. As the tool 10 traverses along the joint line 16, the plasticized material (filler material and work piece material) is transferred from the leading edge of the tool to the trailing edge of the tool shoulder and pin. As it is transferred to the trailing edge, the extrusion zone 46 of the recessed portion 42 helps shape the resulting weld profile as defined by the profile of the extrusion zone 46 and leaves a solid phase bond between the two work pieces 18, 20. To terminate the weld, the linear traversal is terminated and the tool 10 is retracted from the aperture 40. It should be noted that in one embodiment during the deposition friction stir weld process, the rotary tool 10 and die 30 traverse along the joint line 16 of fixedly clamped work pieces 18, 20. During processing, a load is placed on the die 30 and backpressure is applied to the filler material 34. As the rotary tool 10 traverses along the joint line 16, the die 30 is in sliding contact with the work pieces 18, 20 and the filler material 34. The sliding contact of the die 30 with the work pieces is maintained by pressure contact, and the die 30 is continually slid along the surfaces of the work pieces 18, 20 during welding. Optionally, rollers or other traction devices can be integrated with or attached to the bottom surface of the die 30 to facilitate sliding during the friction stir weld process. The exit keyhole effects noted in the prior art processes above can be avoided by retracting the rotary tool while maintaining die pressure with a downward force and filler material feed. The exit can occur with or without linear motion.

In other embodiments, the work pieces 18, 20 may be linearly moved relative to a fixed rotary tool 10 and die 30. In these embodiments, the filler material 34 would be fed or would move upon translation of the work pieces 18, 20.

The filler material 34 itself is preferably chosen to be the same material as the work pieces 18, 20 be joined or is selected to have similar properties or may include a dissimilar material to provide desired metallurgical properties to the weld. The filler material 34 can be considered a consumable feedstock that is added to the weld to enhance the volume of weld material and is deposited into the joined work piece along the weld line. Because of the use of filler material 34 along with the configuration of the die as described, flash formation and/or thinning of the welded region is effectively prevented. Moreover, depending on the thickness of the filler material 34, additional filler material can be provided to form the weld, thereby providing increased load resistance to the welded joint. For example, a cross sectional thickness can be obtained that is greater than the initial cross sectional thickness of the work pieces being joined, if desired.

As previously discussed, the joint region provided by the butted work pieces 18, 20 and the filler material 34 are plasticized in the stir zone, i.e., plasticized at about the localized region of frictional heating. The plasticized material is constrained from free flow by the extrusion zone 46 provided by the die 30 and the surfaces of the work pieces 18, 20 on the other side. Thus, the free formation of flash material is effectively eliminated. Moreover, as the rotary tool 10 and die 30 is advanced, the plasticized material is forced to extrude into the extrusion zone 46. Again, it should be noted that the profiled shape of the extrusion zone 46 could be tailored for the end users desired weld profile. As such, the contour of the extrusion zone 46 advantageously dictates the shape of the weld that can be designed, which can be readily designed for the particular application to minimize stress, for example, thereby optimizing the weld geometry for the particular application.

Figure 5:
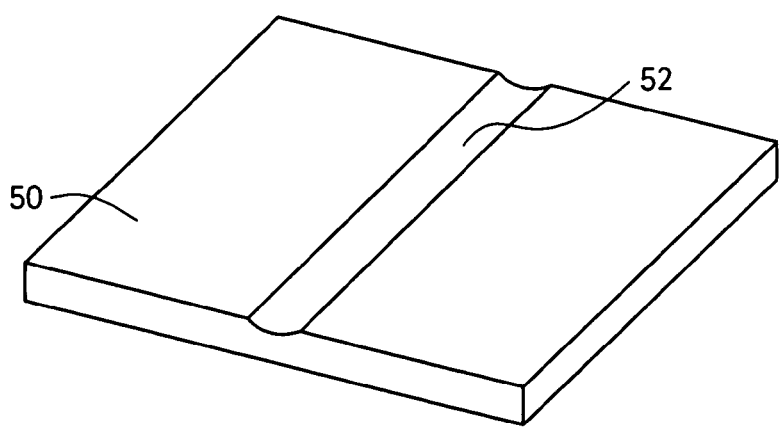
FIG. 5 is perspective view of a second die as viewed from the top surface in accordance with another embodiment of the present disclosure.

In another embodiment, the process further includes applying an opposing die 50 as shown in FIG. 5, i.e., a back plate, to the work pieces 18, 20 to be joined to form a sandwich-like arrangement with die 30. Die 50 includes a recessed portion 52, which can be similar or different to the recessed portion 42 of the top die 30 depending on the desired weld profile. Advantageously, this permits the creation of a symmetrical weld on both the top and bottom surfaces of the work pieces to be joined without the loss of flash material and without thinning from either side. Optionally, filler material 34 can be fed to the recessed portion 52 in a similar manner as described with respect to recessed portion 42.

In some embodiments, the dies 30, 50 can be used to effect the mechanical clamping. That is, a threaded bolt can be in operative communication with the dies 30, 50 to fixedly maintain the work pieces 18, 20 at a stationary position. In these embodiments, the entire sandwich assembly (dies 30, 50 and work pieces 18, 20) would move relative to the rotary tool and the filler material 34 would also be continuously fed. In another embodiment, the work pieces can be tack welded together with fusion, friction or other means to reduce the fixturing requirements.

Advantageously, the deposition friction stir weld process can be applied in a single pass or may be applied in multiple passes, the latter representing a significant commercial advantage and advancement in the field of friction stir welding. In prior friction stir weld processes, the welds were completed in a single pass or were not done at all as a direct consequence of the limitations in those configurations. However, the deposition friction weld process as described herein permits the use of multiple passes with sequential buildups in weld thicknesses, thereby providing some of the advantages associated with fusion welding albeit without the disadvantages. Moreover, by utilizing multiple passes, the clamping loads can be reduced significantly since single pass processes generally require a significant load on the work pieces to provide effective welds. Thus, the deposition friction stir welding process is scale independent, thereby making this process applicable to joining plates of large dimensions with the same equipment utilized for plates of smaller dimensions. As is known by those in the art, equipment costs do not scale linearly with size. That is, prior art rotary tools were scaled to accommodate the dimensions of the work pieces to be joined since only a single pass was possible with the prior art tools and configurations. The present deposition friction stir weld process and configuration can be used for multiple passes, thus providing a process and configuration for economically welding work pieces of relatively large dimensions using relatively smaller rotary tools. Another advantage associated with the use of multiple passes using the deposition friction stir weld process is that harder materials can be more effectively welded. In general, the single pass welding of harder materials stresses the tools and can cause significant wear to the various components of the tool that contribute to friction heating, e.g., the pin. By using multiple passes, the stress of each pass can be minimized compared to prior processes that employed a single pass, which because only a single pass can be made require higher axial and torque loads.

Figure 6:
FIGS. 6 and 7 illustrate top down images of resistance spot welds in type 5754 and type 5182 aluminum processed in accordance with a prior art resistance weld process.
Figure 7:
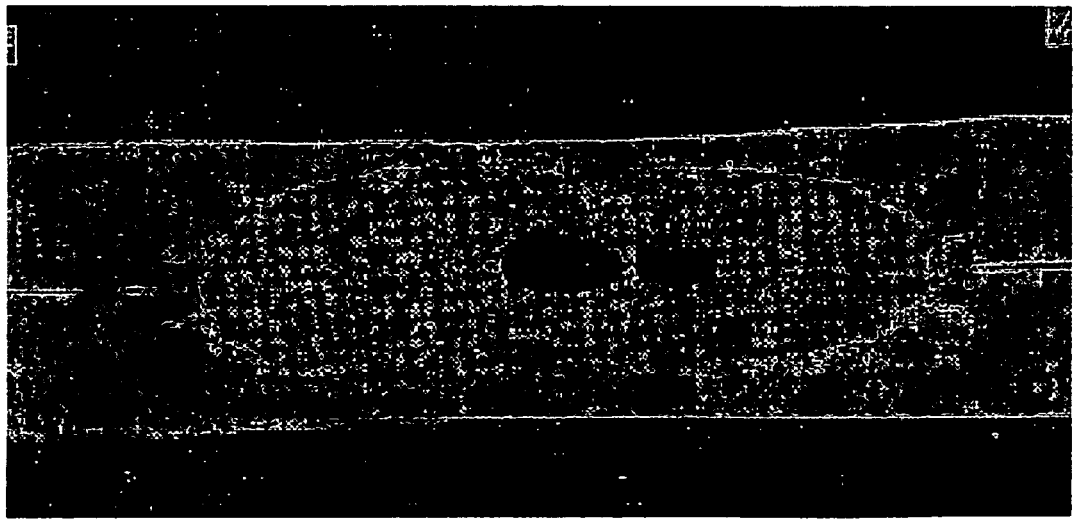
Figure 8:
FIGS. 8 and 9 illustrate a top down view and a cross sectional view of a sport weld of aluminum using the spot friction stir weld process in accordance with the present disclosure.
Figure 9:
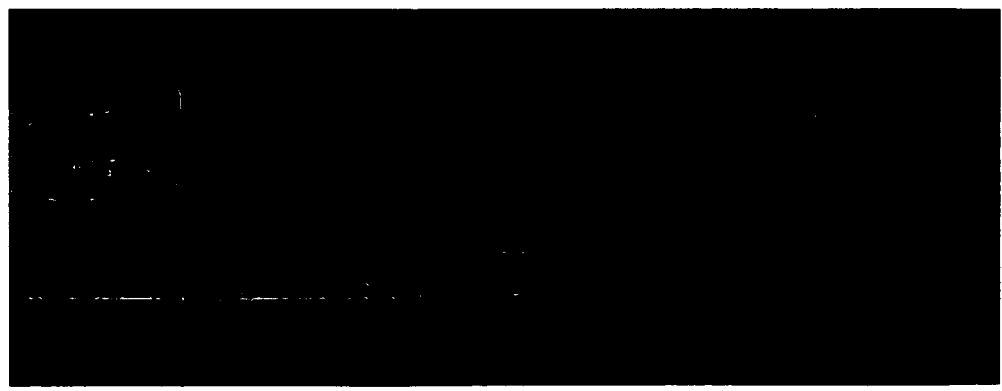

In addition to the aforementioned advantages, the deposition friction stir welding process described herein can now be applied to spot friction welding (SFW) processes. In a typical SFW process, the rotary tool is locally plunged and retracted without translation along a joint line resulting in an exit keyhole effect upon retraction of the tool. Moreover, flash formation and thinning at the local region is observed. Still further, prior art spot welding processes typically use resistance-based spot weld processes, which are known to be prone to forming pores in the spot weld, which decreases the mechanical properties. However, using the deposition friction stir weld process described herein, the use of the die and filler material can contain the flash and shape the weld spot profile while advantageously eliminating the exit keyhole effect noted in the prior art and minimize and/or eliminate pore formation. For example, FIGS. 6 and 7 illustrate to down images of resistance spot welds in type 5754 and type 5182 aluminum. Both images clearly show what is referred to in the art as nugget porosity, which is undesirable. FIGS. 8 and 9 illustrate a top down view and a cross sectional view of a spot weld of aluminum using the spot friction stir weld (SFSW) process. The resulting spot weld is clean and free of nugget porosity. Deposition SFSW can be used to eliminate loss of material due to flashing and the keyhole effect.

Figure 10:
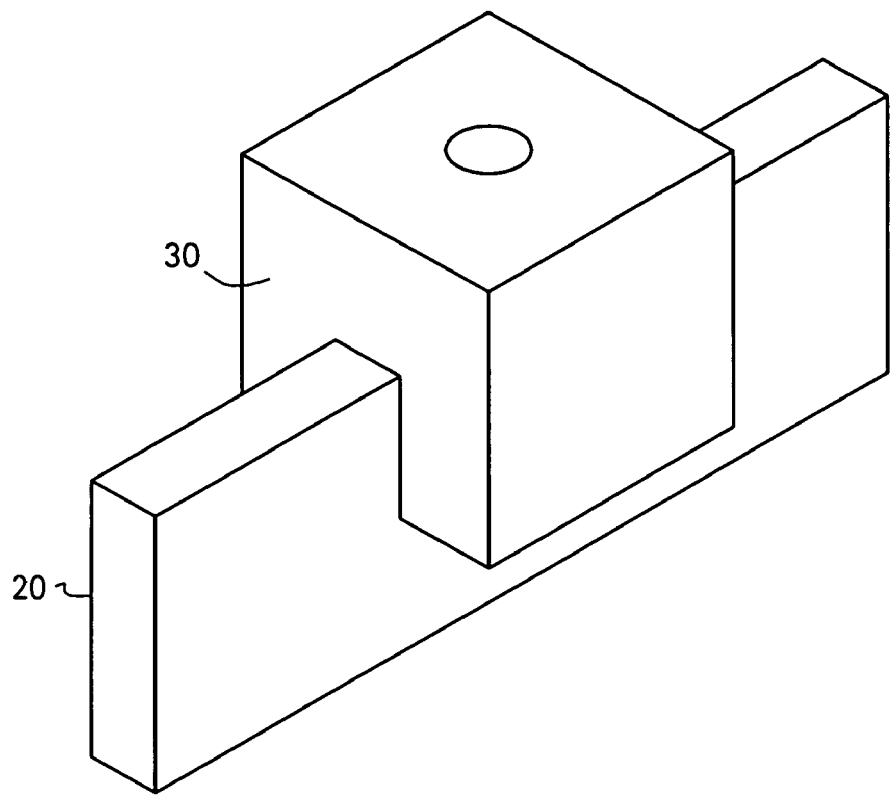
FIG. 10 illustrates a deposition friction stir weld process for contouring a sidewall of a workpiece to produce an engineered structure.

The deposition friction stir weld process also is amenable to rapid prototyping. The containment dies, e.g., 30, can be readily modified to accommodate rapid prototyping. For example, FIG. 10 illustrates an example where sidewalls of a work piece 20 are extruded and shaped to produce an engineered structure.

Figure 11:
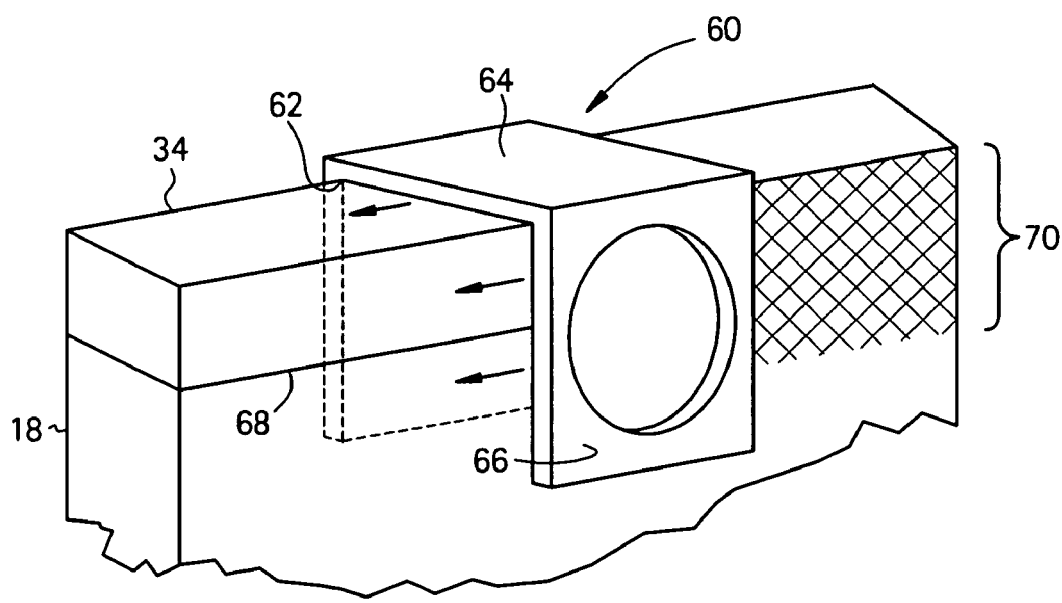
FIG. 11 illustrates a deposition friction stir weld process suitable for contouring a sidewall of a workpiece to produce an engineered structure in accordance with another embodiment.

An alternative contouring arrangement is shown in FIG. 11. As shown, the die 60 includes a backing plate 62, a top plate 64, and an apertured plate 66 for receiving the friction stir welding apparatus (not shown) in the manner previously described. The backing plate 62 is used to counter-act the load of the friction stir welding apparatus 10. Filler material 34 is positioned on the work piece 18 to be contoured and the die 60 or the workpiece 18 is moved along a joint line 68 such that the filler material 34 is joined to the workpiece by operation of the friction stir apparatus 10 as is generally shown by contoured surface 70. The distance between the backing plate 62 and the top plate 64 can be varied by independent movement to accommodate varying work piece thicknesses such as an airfoil and the like. Moreover, it should be noted that the trailing edges of the backing plate 62 and/or the top plate 66 can further include a recessed portion (not shown) so as to provide a smooth and continuous sidewall as may be desired for some applications. In one embodiment, all of contoured surface is plasticized to maintain homogenous properties throughout the structure, i.e., the entire structure will have undergone the stir process.

In addition to rapid prototyping, the deposition friction stir weld is well suited for repairs. Repair techniques currently employing fusion welding are commonplace, which can be problematic because of the high temperatures used in processing. Although material can be added in the process, the high temperatures used in fusion welding can cause undesirable grain growth and impart thermal distortions, deleteriously affecting the mechanical properties and impart thermal distortions. By using the deposition friction stir weld process as described herein, a superior repair can be made since less heat is required to form the repair. For example, on precision ground cast parts, oftentimes repair is not made because of the costs associated with correcting the resulting thermal distortion caused by fusion welding. With the deposition friction stir weld process, distortion is minimized making the repair a cost effective option. Robotics can be used to provide automation of the friction stir welding processes.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A friction stir weld process of joining work pieces using a rotary friction stir welding apparatus comprising a die having an aperture adapted to receive a cylindrical, shouldered rotary tool, said die further comprising a recessed portion defining an inlet zone adapted to accommodate a filler material, the process comprising the steps of:
   placing a filler material on and about a joint line formed by butting a first work piece surface against a second work piece surface by inserting the filler material into the inlet zone of the die; and
   frictionally heating the filler material by placing the die over the joint line to soften the filler material and portions of the first and second work piece surfaces in thermal contact with the filler material and form a weld between the first and second work pieces, wherein frictionally heating is at a temperature below a melting point of the filler material and the first and second workpiece surfaces.

2. The process of claim 1, wherein the filler material comprises a bar, a pellet, or a powder.

3. The process of claim 1, further comprising containing the softened filler material and portions of the first and second work piece surfaces.

4. The process of claim 1, wherein frictionally heating the filler material spot welds the work pieces.

5. The process of claim 1, wherein frictionally heating the filler material is carried out in a direction that traverses along the joint line.

6. The process of claim 1, further comprising multiple passes of frictionally heating the filler material on and about the joint line to increase a cross sectional thickness of the weld.

7. The process of claim 1, further comprising butting at least one additional work piece surface against the first and second workpiece surfaces to form the joint line.

8. A process for depositing material and contouring a surface of a work piece using a rotary friction stir welding apparatus comprising a die having an aperture adapted to receive a cylindrical, shouldered rotary tool, said die further comprising a recessed portion defining an inlet zone and an extrusion zone, the process comprising the steps of:
   inserting a filler material into the inlet zone of the die;
   frictionally heating the filler material and a selected surface of the work piece at a temperature below a melting point of the work piece, wherein the filler material and the selected surface softens to form a plasticized region; and
   containing the filler material and the selected surface of the work piece with the extrusion zone of the die to contour the plasticized region and prevent flash material from being discharged during the frictional heating.

9. The process of claim 8, wherein the process is robotically controlled.

10. The process of claim 8, wherein frictionally heating the filler material and the selected surface of the work piece comprises adjusting for varying thicknesses of the work piece.

11. The process of claim 8, wherein frictionally heating the filler material softens all of the filler material and the selected surface of the work piece.

12. The process of claim 8, wherein frictionally heating the filler material and the selected surface repairs the selected surface of the work piece.

13. A spot friction weld process using a rotary friction stir welding apparatus comprising a die having an aperture adapted to receive a cylindrical, shouldered rotary tool, said die further comprising a recessed portion defining an inlet zone and an extrusion zone, the process comprising the steps of:
   inserting a filler material into the inlet zone of the die;
   frictionally heating a spot and the filler material on a work piece surface to a temperature effective to soften the filler material and a region at and about the spot, wherein the temperature is below a melting point of the work piece surface; and
   containing the spot with the extrusion zone of the die to prevent discharge of a flash material from the work piece surface.

14. The spot friction weld process of claim 13, wherein frictionally heating the spot comprises plunging the rotary tool onto the spot.

15. The spot friction weld process of claim 13, wherein the spot subsequent to frictionally heating the spot and the filler material is free of a keyhole effect.

* * * * *